United States Patent [19]
Cauda et al.

[11] Patent Number: 6,132,649
[45] Date of Patent: Oct. 17, 2000

[54] FABRICATION INCLUDING SOL-GEL PROCESSING

[75] Inventors: Michael J. Cauda, Wyckoff, N.J.; Jorge Sanchez, Geneva, Switzerland; Jorge Luis Valdes, Branchburg, N.J.

[73] Assignee: Lucent Technologies Inc., Murray Hill, N.J.

[21] Appl. No.: 09/240,904

[22] Filed: Jan. 29, 1999

[51] Int. Cl.$^7$ ..................................................... B29D 11/00
[52] U.S. Cl. ........................... 264/1.21; 65/395; 65/17.2; 264/1.24; 501/12; 501/53
[58] Field of Search .................................. 264/1.24, 1.1, 264/1.21; 65/3.11, 13, 18.1, 18.4, 17.1, 17.2, 385, 395; 501/12, 53, 54

[56] References Cited

U.S. PATENT DOCUMENTS

| | | |
|---|---|---|
| 4,217,027 | 8/1980 | MacChesney et al. . |
| 4,262,035 | 4/1981 | Jaeger et al. . |
| 4,537,866 | 8/1985 | Gilson . |
| 4,775,401 | 10/1988 | Fleming et al. . |
| 4,909,816 | 3/1990 | MacChesney et al. . |
| 5,049,338 | 9/1991 | Varaprasad et al. . |
| 5,114,881 | 5/1992 | Kaneko et al. ........................... 65/17.2 |
| 5,192,351 | 3/1993 | Mathur et al. ........................... 65/17.2 |
| 5,240,488 | 8/1993 | Chandross et al. . |
| 5,562,752 | 10/1996 | Fleming, Jr. ............................... 65/395 |
| 5,944,866 | 8/1999 | Chen et al. ................................. 65/395 |
| 5,991,493 | 11/1999 | Dawes et al. . |

FOREIGN PATENT DOCUMENTS

| | | |
|---|---|---|
| 0905087 | 3/1999 | European Pat. Off. . |
| 62-223030 | 3/1986 | Japan . |
| 62-226824 | 3/1986 | Japan . |
| 63-117917 | 10/1986 | Japan . |
| 1-183421 | 1/1988 | Japan . |
| WO97/11992 | 4/1997 | WIPO . |

OTHER PUBLICATIONS

Babonneau, F. "Hybrid Siloxane–Oxide Materials Via Sol–Gel Processing: Structural Characterization", *Polyhedron*, vol. 13, No. 8, 1123 (1994).

Chaput, F. et al. "New Nonlinear Sol–Gel Films Exhibiting Photorefractivity", *Chem. Mater.*, vol. 8, No. 2, 312–314 (1996).

Nishimori, H. et al., "Influence of Size of Dispersed Silica Particles on Preparation of Thick Silica Films by Using Electrophoretic Sol–Gel Deposition", *Bull. Chem. Soc. Jpn.*, vol. 69, No. 3, 815–818 (1996).

Williams, D.L. et al., "Fabrication and characterisation of thin, spin–coated, sol–gel and colloidal silica films," *Proceedings of SPIE*, vol. 2288 (1994).

Mori, T. et al., "Silica Glass Tubes By New Sol–Gel Method", *J. of Non–Crystalline Solids*, 100, 523–525 (1988).

Mah, S.K. et al. "Effect of Dimethyldiethoxysilane Addition On Tetraethylorthsilicate Sol–Gel Process"*Journal of Non–Crystalline Solids*, vol. 183, No. 3, pp. 252–259 (1995).

*Primary Examiner*—Mathieu D. Vargot
*Attorney, Agent, or Firm*—Scott J. Rittman

[57] ABSTRACT

An aqueous dispersion of silica particles is mixed with a dialkyldialkoxysilane monomer, e.g., dimethyldiethoxysilane (DMDES), typically under basic conditions. Optionally, the monomer, or a portion thereof, is partially reacted prior to mixing, such that it is possible for a polydialkylsiloxane oligomer, e.g., polydimethylsiloxane (PDMS), to be added either with or instead of the monomer. The addition of the monomer (or oligomer) induces gelation of the silica. The contemplated mechanism is that the silanol groups on the growing polydialkylsiloxane chains are able to condense with silanol groups found on the silica particle surfaces, thereby anchoring the chains to the particles. These chains appear to have the ability to form bridges between particles and/or loops on individual particles. Such bridges appear to initiate formation of a silica particle network, and both the bridges and loops increase the silica particles' hydrophobicity. Both of these features contribute to gelation of the silica particles, substantially independent of the particles' surface charge.

14 Claims, 1 Drawing Sheet

FABRICATION INCLUDING SOL-GEL PROCESSING

BACKGROUND OF THE INVENTION

1. Field of the Invention

The invention relates to silica sol-gel processing methods.

2. Discussion of the Related Art

Glass optical fiber is typically drawn from a solid preform containing an overcladding that surrounds an inner cladding and core. An overcladding tube is generally formed separately from the inner cladding and core, and the components are then brought together to make the preform. The overcladding does not have to meet the demanding purity and uniformity specifications of the core and inner cladding, and some efforts at lowering the cost of optical fiber manufacturing processes have therefore focused on the overcladding. These efforts have led to the use of sol-gel processes to form overcladding tubes.

U.S. Pat. No. 5,240,488, the disclosure of which is hereby incorporated by reference, discloses a sol-gel process for production of overcladding tubes. In the process, an aqueous colloidal silica dispersion is used. The dispersion is typically stabilized by addition of a base such as tetramethylammonium hydroxide (TMAH). TMAH is believed to stabilize silica particles by the following mechanism: Introduction of the TMAH solution into a silica dispersion raises the pH value. The silica then takes on a negative surface charge due to ionization of silanol groups present on the surface, in accordance with the following reaction:

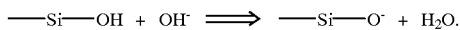

The negative charge on the silica particles creates mutual repulsion, preventing substantial agglomeration and maintaining the stability of the dispersion. A pH of about 11 to 14 is indicated to be required. At a later stage in the process, as discussed at Col. 15, lines 39–65 of the '488 patent, a gelling agent such as methyl formate is added to reduce the pH. The methyl formate, through reaction with water and/or base, neutralizes the negatively-charged silica to a degree where gelation is induced, i.e., reduces the zeta potential to near-zero. (Zeta potential is the potential across the diffuse layer of ions surrounding a charged colloidal particle, and is typically measured from electrophoretic mobilities—the rate at which colloidal particles travel between charged electrodes placed in a solution. A negative or positive zeta potential indicates some repulsion between particles.)

While processes such as that of the '488 patent produce good results, use of TMAH has caused some inconveniences in large-scale optical fiber fabrication. As shown in the Table in Cols. 11 and 12 of the '488 patent, once a gelled tube is dried, the tube must be heated to drive off volatile organic materials and water. During this heating, the tetramethylammonium salt that is present (e.g., tetramethyl ammonium formate in the reaction of the '488 patent) breaks down to an extent into trimethylamine (TRIMA), which has an undesirable odor, and is volatile and flammable. Similarly, methyl formate produces a by-product of formaldehyde, which is also an odorous material.

Thus, the use of TMAH, as well as methyl formate, in sol-gel overcladding fabrication has the potential to complicate an optical fiber manufacturing process. Alternative sol-gel fabrication techniques have therefore been sought.

One attempt at an alternative solution is reflected in Japanese Kokai Patent Application No. 1-183421 (the '421 application). The method of the '421 application involves (1) forming linear polysiloxane polymer by reacting a full alkoxysilane, i.e., a tetraalkoxysilane monomer, in the presence of an acidic catalyst, (2) preparing a silica particle sol by a conventional TEOS (tetraethoxysilane) technique in the presence of a basic catalyst, and (3) mixing the two sols to obtain gelation. According to the examples of the '421 application, however, attaining gelation is difficult and time-consuming. Specifically, in the examples, gelation was reached only by holding the mixed sols at 5° C. for an undisclosed time, and then waiting 2–3 more days before the gelled body could be handled. Drying then took 15–25 days at 60–70° C. and 3 days at 100° C. These conditions are not acceptable for most applications.

A type of hybrid material also using alkoxysilanes is described in F. Babonneau, "Hybrid Siloxane-Oxide Materials Via Sol-Gel Processing: Structural Characterization," *Polyhedron*, Vol. 13, No. 8, 1123 (1994). Babonneau discusses hybrid material formed by reacting a mixture (the sol) of tetra-functional alkoxysilanes and di- and/or tri-functional alkoxysilanes, to obtain a cross-linked structure (the gel), as reflected in FIG. 8 of the reference. The di- or tri-functional alkoxysilanes appear to act as roadblocks for the propagation of the tetrafunctional alkoxysilane $(Si(OR)_4)$, resulting in the hybrid cross-linked structure. However, these systems tend to exhibit small pores that lead to high capillary pressures during drying. The high capillary pressures cause cracking and breakage, such that formation of bodies larger than 1 kg has been extremely difficult. The applicability of such hybrid materials for commercial uses such as overcladding tubes is therefore questionable.

Thus, further improvements and alternatives for sol-gel fabrication are desired.

SUMMARY OF THE INVENTION

The invention provides an approach to fabricating sol-gel bodies that avoids several undesirable features of previous methods. According to the invention, an aqueous dispersion of silica particles is added to a dialkyldialkoxysilane monomer, e.g., dimethyldiethoxysilane (DMDES), under basic conditions. (Optionally, the monomer, or a portion thereof, is partially reacted prior to the addition, such that it is possible for a polydialkylsiloxane oligomer, e.g., polydimethylsiloxane (PDMS), to be added either with or instead of monomer.) The monomer (or oligomer) induces gelation of the silica. This relatively simple, one-step method for inducing gelation of dispersed silica particles allows for use of lesser amounts of undesirable chemicals than conventional processes. For example, because the invention is able to performed in a weakly basic environment, it is possible to use weaker bases such as ammonia and ethanolamine, which are more desirable than TMAH. And even if TMAH is used (which is generally advantageous to help initially stabilize the dispersion), lesser amounts are needed compared to conventional processes (which require pH values of 11 to 14). The process of the invention also does not require any gelling agents such as methyl formate, and provides for gelation and drying within an acceptable time period, e.g., initial gelation complete about 90 to about 120 minutes after mixing with the monomer/oligomer, and curing completed within about 12 to 24 hours of the mixing (assuming maintenance of room temperature throughout the gelation and curing processes). Also, relatively large bodies, e.g., greater than 1 kg, are capable of being formed. (Completion of initial gelation indicates that the material no longer exhibits liquid characteristics. Curing indicates that gelation occurs to a degree where the body is capable of being removed from a mold and further processed without breakage or substantial deformation.)

In the mixture, the silanol groups on the growing polydialkylsiloxane chains are able to condense with silanol groups found on the silica particle surfaces, thereby anchoring the chains to the particles. These chains appear to have the ability to form bridges between particles, and form loops on individual particles (by connecting to the particle at two distinct points on its surface). Such bridges initiate formation of a silica particle network, and both the polydialkylsiloxane bridges and loops increase the silica particles' hydrophobicity. Both of these features appear to contribute to gelation of the silica particles, substantially independent of the particles' surface charge, unlike the reliance of more conventional sol-gel processes on electrostatic destabilization of a dispersion.

In one embodiment, the silica particle dispersion is stabilized, by addition of a base, at a pH of about 8 to about 12. About 2 to about 10 wt. % DMDES monomer (based on the weight of the entire mixture) is mixed with the silica dispersion. Initially, the DMDES is not miscible in the aqueous dispersion, but as the monomer begins to hydrolyze, the resulting compounds are readily soluble. After a relatively short period of time, e.g., 15 to 30 minutes, a one-phase system is generally obtained, and the mixture is poured into a mold. For a typical overcladding tube, initial gelation is complete after 90 to 120 minutes, and the tube is able to be launched and dried (i.e., curing is complete) after 12 to 24 hours, where the gelation and curing occur at room temperature. Higher temperatures will, as expected, speed the gelation and curing processes.

DETAILED DESCRIPTION OF THE INVENTION

Figure 1:
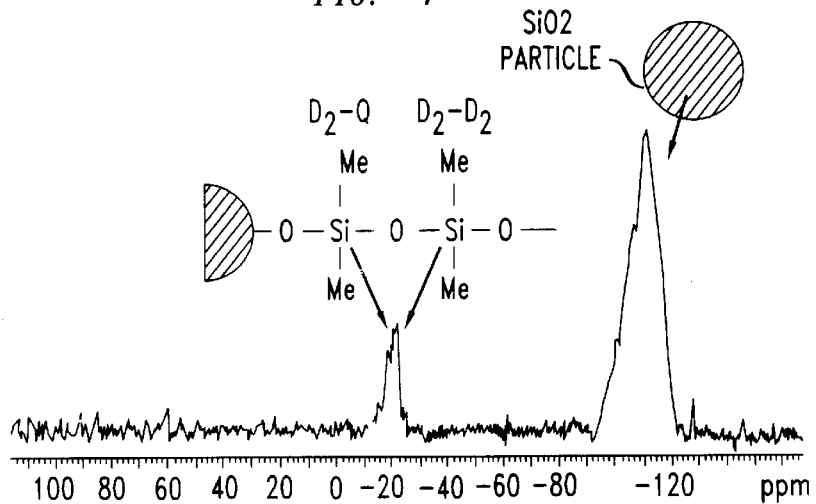
FIG. 1 shows a magic-angle spinning $^{29}$Si-NMR spectrum of a gel made according to the invention.

In one embodiment of the invention, an aqueous silica dispersion is obtained or formed. The dispersion generally contains about 30 to about 70 wt. % silica, advantageously about 30 to about 55 wt. % silica, based on the weight of the dispersion. The silica advantageously has a surface area of about 30 to about 100 m$^2$/g, more advantageously about 40 to about 50 m$^2$/g. (One suitable dispersion is L-50 Cab-o-Sperse® from Cabot Corporation.) The dispersion is generally stabilized at a pH ranging from about 8 to about 12, advantageously about 9 to about 11. At pH values less than about 8 and greater than about 12, the resultant gel tends to be undesirably weak. A variety of Lewis bases are suitable for stabilization, e.g., primary, secondary, or tertiary amines having a pK$_a$ of about 8 to about 12. Typical bases include TMAH, ammonia, and ethanolamine. Even if TMAH is not the sole stabilizing base, it is useful to have a small amount, e.g., about 0.25 to about 0.3 wt. %, of TMAH in the dispersion, since the TMAH appears to help the fabrication process. (Commercially-available dispersions generally contain a relatively small amount of TMAH to provide initial stabilization and shelf-life.)

To the stabilized dispersion is added about 2 to about 10 weight percent of dimethyldiethoxysilane monomer (DMDES), based on the total weight of the dispersion (including the DMDES). Advantageously, the mixture is vigorously stirred. DMDES has the following structure:

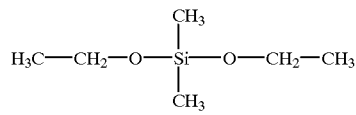

This monomer is not miscible in the aqueous dispersion, but the products of hydrolysis, i.e.,

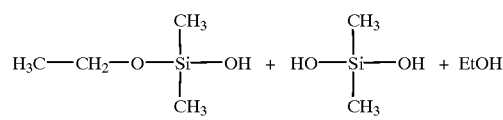

are readily soluble in the aqueous dispersion (where the hydrolysis typically occurs under mildly basic conditions, e.g., pH of about 8 to about 11). Formation of the ethanol during hydrolysis also contributes to improved solubility.

Because DMDES has two condensable ethoxy groups, the monomer eventually polymerizes (through hydrolysis and condensation) to produce hydroxy-terminated polydimethylsiloxane (PDMS):

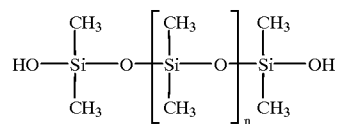

Typically, n ranges from 4 to 10 in the mixture.

Instead of adding DMDES monomer, it is possible to separately react the DMDES to form some PDMS chains of relatively low molecular weight, e.g., where n in the formula above is 4 to 6, and add this oligomer to the particle dispersion. (As used herein, polydialkylsiloxane oligomer indicates that the molecule contains 5 to 7

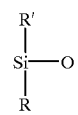

units, where R' and R are alkyl groups.) Directly adding oligomer reduces the wait time for a homogeneous mixture, and reduces the required mixing of the silica dispersion, which in turn lowers the amount of entrapped air that must be removed later. It is possible to mix with the dispersion, therefore, monomer, oligomer, or a mixture thereof.

After a relatively short period of time, e.g., 15 to 30 minutes, a one-phase system is generally obtained, and the mixture is poured into a mold. For a typical overcladding tube, initial gelation is complete after 90 to 120 minutes, and the tube is cured, e.g., able to be launched and dried, after 12 to 24 hours, where gelation and curing occur at room temperature. These values will vary depending on the particular parameters of the process, e.g., the type and extent of stirring and the temperature.

While not limiting the invention to any theory, the mechanism of gelation is believed to be as follows. Silica particles in aqueous dispersion contain silanol (Si—OH) surface groups. These silanol surface groups behave the same as silanol groups on growing PDMS (or other polydialkylsiloxane) chains. Thus, the silanol groups terminating the chains are capable of condensing with the silanol groups on the particle surfaces, thereby covalently anchoring the PDMS chains onto the silica particles. If one chain bonds to different particles, a bridge if formed, and if one chain bonds to separate silanol groups on a single particle, a loop is formed. Such bridges initiate formation of a silica particle network, and the presence of PDMS on the particle surface increases the silica particles' hydrophobicity. Both of these features appear to contribute to gelation of the silica particles. Typically, bridges/loops containing 4 to 10 silicon atoms provide useful properties. Larger oligomers tend to cause phase separation and formation of small droplets of oligomer.

Several factors are involved in the mechanism of gelation according to the invention. For example, condensation that leads to extension of polydialkylsiloxane chains competes with condensation that attaches such a chain to a silanol surface group, which terminates a chain. Because the kinetics of such condensation reactions (as well as hydrolysis) are strongly affected by the pH, the monomer concentration, and the monomer type, these three factors play a significant role. (The pH is also capable of modifying the silica particle surface charge and thus the stability of the dispersion.) High pH values, e.g., greater than about 12, tend to lead to weak gel bodies, because, it is believed, a slowed rate of condensation and breakdown of the oligomer at such high pH values leads to inadequate particle-polymer bonds (i.e., not enough bridges and/or loops). Low pH values, e.g., lower than about 8, also tend to cause weakness, because, it is believed, the silica particles are weakly charged and do not carry enough deprotonated silanol to anchor polymer chains. Also, the dispersion typically is not sufficiently stabilized prior to mixing with the monomer/oligomer at such lower pH values, making it difficult to obtain a homogeneous mixture. Monomer/oligomer loadings less than about 2 wt. % tend to produce weak gels because, it is believed, not enough particle-polymer bonds are formed. High monomer/oligomer loadings, e.g., greater than about 10 wt. % tend to produce strong but brittle gel bodies, due to, it is believed, a high density of particle-polymer bonds. Higher loadings also appear to increase syneresis (syneresis is the shrinkage of the gel in the mold, and typically adds strength and eases removal from the mold). This is due, it is believed, to increased shrinkage and higher expulsion of water caused by the hydrophobic enhancement of the silica surface due to presence of the alkyl units.

It is also possible to use other dialkyldialkoxysilane monomers and polydialkylsiloxanes, based on these guidelines. It is possible for the two alkyl groups attached to a silicon atom to be the same or different. Contemplated alkyl groups include, but are not limited to, methyl, ethyl, and propyl. It is also possible for the two alkoxy groups attached to a silicon atom to be the same or different. Contemplated alkoxy groups include, but are not limited to, methoxy, ethoxy, isopropoxy, propoxy. The alkyl and alkoxy groups are generally not of such size that solubility in the aqueous dispersion becomes difficult, and this solubility factor tends to define the upper size limit when selecting the groups.

After the gel body exhibits suitable physical properties, the body is capable of being launched from the mold and dried. Drying is performed according to conventional procedures, such as discussed in U.S. Pat. No. 5,240,488, referenced previously. It is expected, however, that the drying process of a gel formed according the invention will be easier than drying of sol-gel bodies formed according to previous processes. Specifically, the presence of the hydrophobic polydialkylsiloxane chains increases the overall hydrophobicity of the gel. Thus, it is expected that water will tend to bond less strongly to the silica surface and will flow more readily from the gel. Also, it is believed that the bridged particles will be more capable of rearranging themselves, as compared to conventional, electrostatically destabilized gels. Such rearrangement would appear to offer release of drying stresses. In addition, silanol-terminated polydialkylsiloxane chains are known surfactant agents, and would be expected to decrease the capillary tension of water inside the pores of the material. All of these factors are expected to lead to the ability to more rigorously dry (e.g., at higher temperatures for shorter drying times) bodies formed according to the invention. After drying, the body is capable of being dehydroxylated and sintered by conventional processes, such as discussed in U.S. Pat. No. 5,240,488, referenced previously.

The process is useful for fabricating overcladding tubes for optical fiber preforms, as discussed, for example, in U.S. Pat. No. 5,240,488, referenced previously, as well as substrate tubes for such preforms. To obtain a finished preform, the overcladding tube is typically placed over a core rod, and the components are heated and collapsed into a solid, consolidated preform, as discussed in U.S. Pat. No. 4,775,401, the disclosure of which is hereby incorporated by reference. The core rod is fabricated by any of a variety of vapor deposition methods known to those skilled in the art, including vapor axial deposition (VAD), outside vapor deposition (OVD), and modified chemical vapor deposition (MCVD). MCVD is discussed in U.S. Pat. Nos. 4,217,027; 4,262,035; and 4,909,816, the disclosures of which are hereby incorporated by reference. MCVD involves passing a high-purity gas, e.g., a mixture of gases containing silicon and germanium, through the interior of a silica tube (known as the substrate tube) while heating the outside of the tube with a traversing oxy-hydrogen torch. In the heated area of the tube, a gas phase reaction occurs that deposits particles on the tube wall. This deposit, which forms ahead of the torch, is sintered as the torch passes over it. The process is repeated in successive passes until the requisite quantity of silica and/or germanium-doped silica is deposited. Once deposition is complete, the body is heated to collapse the substrate tube and obtain a consolidated core rod in which the substrate tube constitutes the outer portion of the inner cladding material.

The invention will be further clarified by the following examples, which are intended to be exemplary.

EXAMPLE 1

A sol-gel body was formed as follows. The silica dispersion used was L-50 Cab-o-Sperse® (from Cabot Corporation), which contains 46 wt. % silica particles having an average diameter of about 100 nm, along with about 0.06M tetramethylammonium hydroxide. The pH of the dispersion was about 10. Three wt. % DMDES was added, based on the weight of the monomer plus dispersion, under vigorous stirring. The mixture was stirred for about 30 minutes, and, at 45 minutes, placed into an approximately 4 inch outer diameter tube with a central mandrel having a diameter of about 1 inch, and degassed in the tube. The body appeared to be substantially gelled between about 90 and 120 minutes. The resulting body was able to be successfully launched from the tube after about 12 hours.

EXAMPLE 2

A sol-gel sample was made according to Example 1 and dried by air convection at 20° C. The sample was then examined by magic-angle spinning $^{29}$Si-NMR. The MAS-NMR spectrum is shown in FIG. 1. The spectrum shows that two types of —O—Si(CH$_3$)$_2$—O— sites are present (they are noted by D$_2$, which indicates that the silicon atom carries two siloxane bonds). The peak at −21.3 ppm indicates D$_2$ sites in PDMS chains surrounded by other D$_2$ sites, while the peak at −18.2 ppm indicates D$_2$ sites attached to silica particle surfaces. Based on the respective areas of the two peaks, the average length of the PDMS chains from particle to particle (or looped) are approximately 6 (at most, less than 10). In addition, no unreacted silanol groups on polymeric chains were found, suggesting that no dangling chains were left in the dried gel.

EXAMPLE 3

Figure 2:
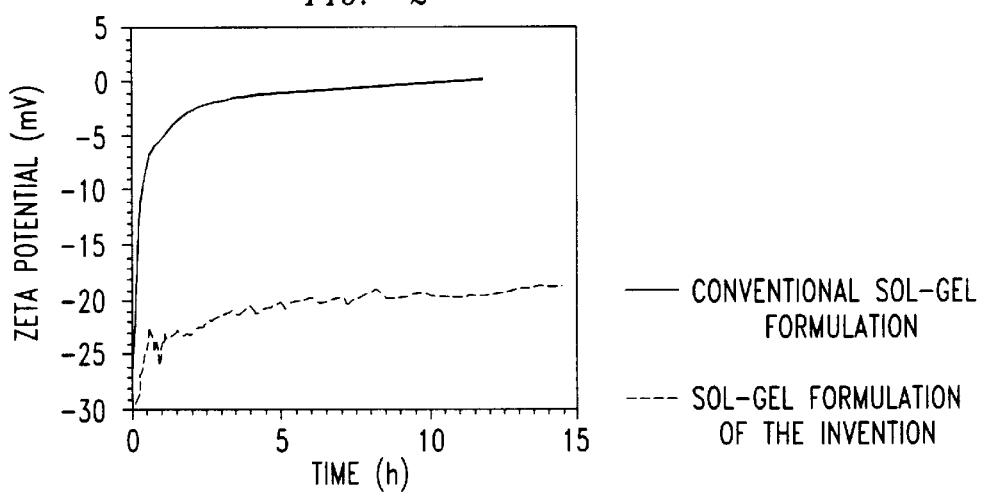
FIG. 2 shows the zeta potential vs. time for gelation of a dispersion according to the invention.
Figure 3:
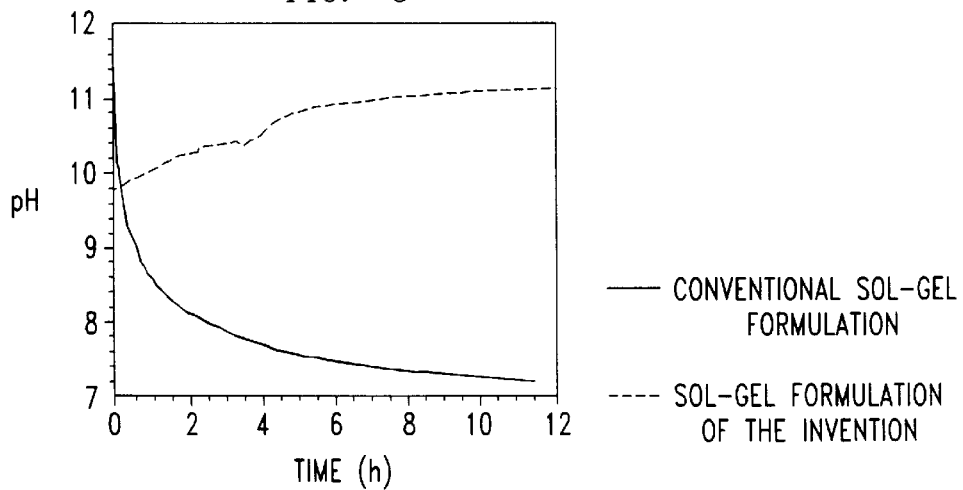
FIG. 3 shows the pH vs. time for gelation of a dispersion according to the invention.

During preparation of a sol-gel body according to Example 1, the zeta potential was measured over time (by an electroacoustic technique using a MATEC MBS-8000 system). The results are shown in FIG. 2 (with a conventional sol-gel preparation shown for comparison purposes). (Note that gelation was substantially completed after about 2 hours.) Initially, the zeta potential decreased rapidly, but eventually, it reached an asymptotic value of about −20 mV, down from its starting value of about −30 mV. (A silica sol having a zeta potential of −20 mV, without added monomer or oligomer as in the invention, will not gel under conventional preparation conditions, but must instead reach a zeta potential of about zero to gel, as reflected in the comparison plot). The polymer chains thus induced gelation even though the particles maintained some mutual repulsion. The pH was also measured over time in this Example, as shown in FIG. 3. A comparison of FIG. 2 and FIG. 3 illustrates that the decrease in zeta potential of the sol was accompanied by an increase of one pH unit. This result is counter-intuitive for silica sols, for which an increase in pH generally results in a increase in the negative charge of the particles. (As shown by the comparison plot in FIG. 3, a conventional sol-gel formulation generally is provided with a lowering in pH in order to reduce zeta potential and thereby induce gelation.)

Thus, the combination of an observed decrease in zeta potential along with an increase in pH illustrates that negatively-charged silanol groups at the surface of the silica particles interact with the polymer bridges and/or loops discussed herein.

Other embodiments of the invention will be apparent to those skilled in the art from consideration of the specification and practice of the invention disclosed herein.

What is claimed is:

1. A process for fabricating a sol-gel article, comprising:

providing an aqueous dispersion comprising silica particles;

adding to the dispersion at least one compound selected from a dialkyldialkoxysilane monomer and a polydialkylsiloxane oligomer, wherein addition of the compound induces gelation of the dispersion such that a gelled body is formed;

drying the body; and dehydroxylating and sintering the body.

2. The process of claim 1, wherein the dialkyldialkoxysilane monomer is a dialkyldiethoxysilane monomer.

3. The process of claim 2, wherein the dialkyldiethoxysilane monomer is dimethyldiethoxysilane.

4. The process of claim 1, wherein the polydialkylsiloxane oligomer is polydimethylsiloxane.

5. The process of claim 1, wherein the pH value of the dispersion subsequent to the addition step is about 8 to about 12.

6. The process of claim 5, wherein the pH value is about 9 to about 11.

7. The process of claim 1, wherein about 2 to about 10 weight percent of the at least one compound is added, based on the total weight of the entire dispersion plus the at least one compound.

8. The process of claim 1, wherein the dispersion contains about 30 to about 55 weight percent silica, prior to the addition step.

9. The process of claim 5, wherein the dispersion further comprises tetramethylammonium hydroxide.

10. The process of claim 9, wherein the dispersion contains about 0.25 to about 0.30 wt. % of tetramethylammonium hydroxide prior to the addition step.

11. The process of claim 9, wherein the pH value of the dispersion prior to the addition step is about 8 to about 12.

12. The process of claim 1, wherein the gelation comprises an initial gelation period that is completed in less than 2 hours.

13. The process of claim 1, wherein the gelation comprises a curing period that is completed in less than 24 hours.

14. The process of claim 1, wherein the article is an optical fiber preform.

* * * * *